May 19, 1970  W. D. VOELKER  3,512,216
INJECTION MOLDING NOZZLE SUPPORT
Filed March 26, 1968
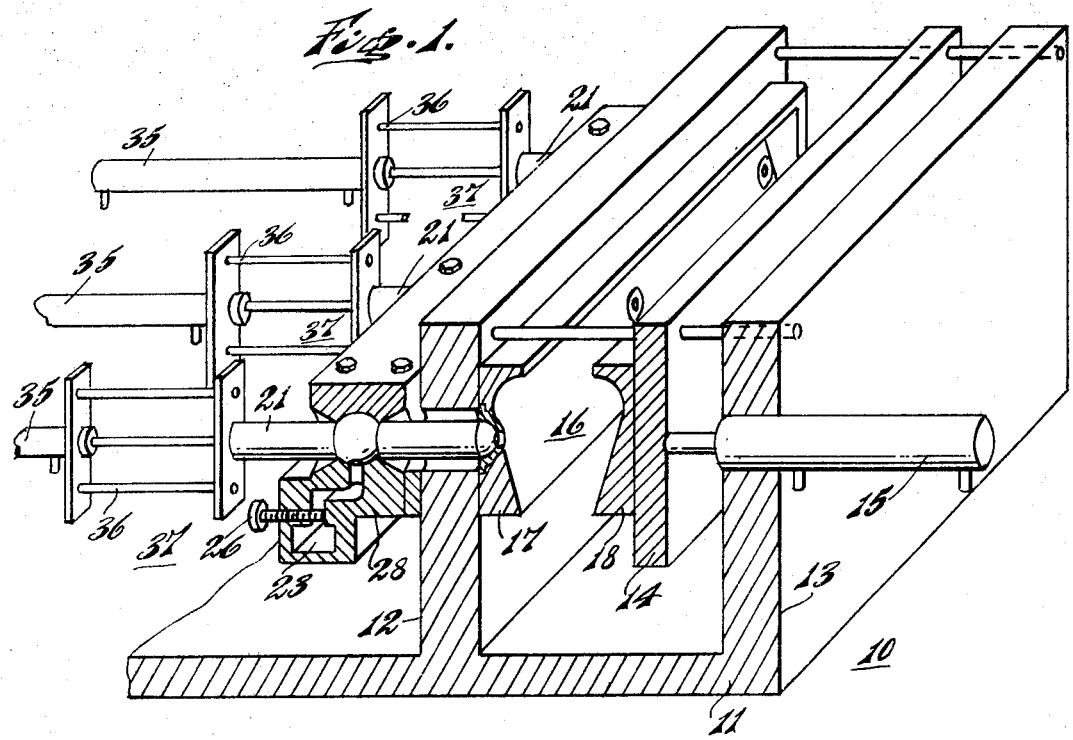
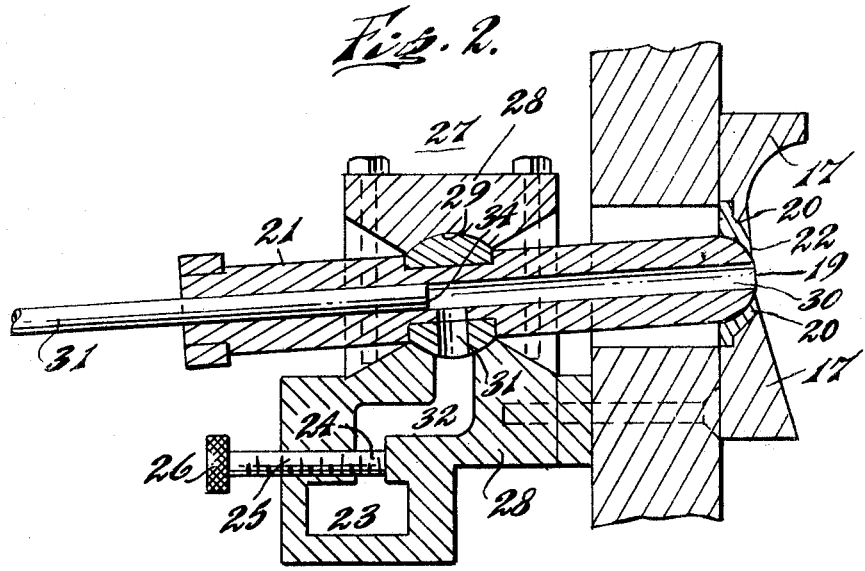
INVENTOR.
Walter D. Voelker
BY John R. Ewbank
ATTORNEY › # United States Patent Office 3,512,216
Patented May 19, 1970

3,512,216
INJECTION MOLDING NOZZLE SUPPORT
Walter D. Voelker, Philadelphia, Pa., assignor to Bischoff
Chemical Corporation, Hicksville, N.Y.
Filed Mar. 26, 1968, Ser. No. 716,009
Int. Cl. B29f 1/03
U.S. Cl. 224—42.1       3 Claims

ABSTRACT OF THE DISCLOSURE

High pressure gas is dispersed in polyethylene or other thermoplastic material. A selected amount of the molten plastic foam flows during a very brief filling step through a heated delivery line, through a plurality of nozzles, and into a mold. Because of the reduction of pressure, each pore of gas expands upon entering the mold, and the composition promptly hardens into a structural plastic article having a pore volume of the magnitude of 50%. The relatively large article is removed from the split mold. The plurality of nozzle tips engage with the seats for the orifices of the mold. Of importance, each nozzle is supported by a ball and socket joint, whereby its nozzle tip may be moved about 3 mm. from its central position. Thus minor imprecision in the location of the plurality of orifices in the mold, or thermal expansion differences between the mold and the delivery line, are compensated for by small but universal movement of the tip of each nozzle about the ball and socket joint by which it is supported. The connection between the nozzle and mold is maintained leakproof by reason of the small but universal movement of the nozzle tip which is permitted by the ball and socket support.

BACKGROUND

Injection molding was initially developed for very small articles which could cool rapidly after the filling of the mold with pressurized liquid. Unique problems are involved in the injection molding of large articles requiring a plurality of nozzles for promptly filling the mold with the predetermined quantity of material. The mold is desirably secured to the molding apparatus in such a manner that no material leaks at any interface between a nozzle tip and a seat of an orifice of the mold, either at the time of start-up or after prolonged operation. However, difficulties have been in achieving leakproofness in molding large articles from many nozzles. Variations in air currents, variations in ambient temperature, and related variables affect the temperature of the mold. Different plastics require the heating of the delivery lines and related portions of the molding apparatus to different temperatures for maintaining the desired viscosity of the material. The thermal expansion characteristics of the mold generally differ from those of the apparatus to which the nozzle is attached. Even if the distance between a pair of nozzles and the distance between the corresponding orifices of a large mold were identical at one temperature, the distances could be non-idenical at another temperature. Heretofore the plurality of nozzles have been rigidly mounted on injection molding machines without any recognition of the differences between the molding of small articles and the injection molding of large articles.

SUMMARY

By the present invention, each of the plurality of nozzles is supported by a ball and socket joint permitting the tip of the nozzle to swing a distance of about 3 mm. from its central alignment position. Such ball and socket support permits the nozzle tip to swing anywhere within a slid angle defined by such 3 mm. departure from central alignment of the tip of the nozzle. Molding apparatus is oftentimes designed so that the central alignment of each of the approximately parallel nozzles is generally parallel to the direction of the reciprocation of the movable portion of the split apart mold. Because of the restricted movement possible for the tip of each nozzle, the joint between the nozzle tip and the seat of the orifice of the mold can be maintained in leakproof condition over a greater variety of typical industrial conditions than has been attainable by previous apparatus. Moreover, the availability of such movement of each nozzle permits preparation of the mold at a lower cost, inasmuch as the tolerance of imprecision for the distance between the orifices can be greater than for apparatus having rigidly mounted nozzles. Both the nozzle tip and seat desirably have spherical surfaces, the tip desirably being relatively more abrasion resistant than the replaceable seat.

IDENTIFICATION OF DRAWINGS

In the accompanying drawings, FIG. 1 is a schematic showing of a portion of an injection molding apparatus featuring ball and socket supports for each of a plurality of nozzles supplying gas-containing thermoplastic to a mold for a large article. FIG. 2 is a cross-sectional view of one embodiment of a ball and socket support means for one of the nozzles.

DESCRIPTION OF AN EMBODIMENT

A molding apparatus 10 comprises a base 11, upright standard 12, and vertical member 13. A movable platen 14 can be reciprocated horizontally by actuation of hydraulic cylinder 15 mounted on the vertical member 13. A split mold 16 comprises a fixed portion 17 and a movable portion 18. The movable portion 18 is secured to the movable platen 14. When the mold is open, as shown in FIG. 1, the molded article can drop from the mold 16 onto the base 11, from which it can be removed prior to any reopening of the mold 16.

The fixed portion 17 of the mold 16 has orifices 19 through which the mold is filled. Each orifice 19 has a seat 20, which is desirably of the replaceable bushing type. The orifices 19 are positioned to correspond with the arrangement of the plurality of nozzles 21 of the molding apparatus. A spherical face of a nozzle tip 22 of the nozzle 21 fits against a spherical face of the seat 20 of the orifice 19. The radius of the spherical surface of the tip 22 is desirably about the same as the radius for the spherical surface of the seat 20. Such radius is ordinarily a small fraction of the radius from a ball and socket joint 27 to the tip 22. The nozzle tip 22 is desirably relatively more abrasion resistant than the seat 20, which can be replaced if deformed.

Thermoplastic material containing dispersed gas under pressure may be prepared as disclosed in Angell 3,268,636, and flow from a supply source through a delivery line 23 toward each of the nozzles. The molten plastic foam, in flowing from the delivery line 23 to a nozzle, flows through a regulating valve 24 comprising a shaft 25 and knob 26. Each nozzle 20 is secured to the molding apparatus by a ball and socket joint 27 comprising a globular clamp 28 and a spherical-type bearing 29 on the nozzle. The nozzle 21 has an axial bore serving as an injection passageway 30 through which the plastic foam flows to the orifices 19 of the mold 16. In the zone of the spherical-type bearing of the nozzle 21, a passageway 31 from the injection passageway 30 to a passageway 32 in the globular clamp 28 permits the material to flow from the regulating valve 24 to the injection passageway 30.

The installation of a purging pin 33 permits it to be in either an advanced position or a retracted position or be reciprocating therebetween. In the retracted position, the end 34 of the purging pin 33 is withdrawn just past the passageway 31, whereby plastic foam may flow from passageway 31 into the injection passageway 30, and the purging pin is maintained in such retracted position during the very brief filling cycle of the mold. At the end of the filling cycle, the end 34 of the purging pin is advanced to the nozzle tip 22, thereby purging the injection passageway 30 of plastic foam. The purging pin is maintained in its advanced position during most of the operating cycle, and then reciprocates back to the retracted position for the next filling cycle.

Each purging pin 33 is actuated by its hydraulic cylinder 35, positioned at the end of the nozzle opposite the nozzle tip 22, so that the hydraulic cylinder 35 swings about the ball and socket joint 27 simultaneously with the nozzle tip 22. Spacing members 36 position the hydraulic cylinder 35 with respect to the principal portion of the nozzle 21. The hydraulic cylinder provides independent actuating means for its purging pin, and thus is distinguishable from the gang operation of parallel purging pins of rigidly mounted nozzles. The hydraulic cylinder shifts the purging pin to a regulated retracted position at the beginning of the next mold-filling operation.

Although efforts are made to align the orifices 19 of the fixed part 17 of the mold 16 with the array of nozzles 21, some molds may be made in such a manner that perfect alignment does not result. The likelihood of making such an error is increased as the size of the mold and the distance between the farthest apart nozzles is increased. During operation of the apparatus, the delivery line 23 and related components are maintained at an elevated temperature to assure the flowable condition of the thermoplastic material. The mold 16 is kept cool enough to chill the entering thermoplastic material and to permit the article to be removed after each molding cycle. Thus there is a temperature difference between the mold 16 and the delivery line 23 and related parts of the molding apparatus. The tip 22 portion of the nozzle 21 is relatively cool and the spherical bearing portion of the nozzle is hot. Thermal expansion problems complicate the maintenance of alignment of all of the nozzle tips 22 with all of the seats 20 of the orifices 19 of the mold 16. The ball and socket support 27 for each of the nozzles 21 permits each nozzle independently to adapt its position so that it can be seated accurately and sealed against its seat 20 in any of the alignment positions which are within the 3 mm. departure from central alignment of the nozzle tip 22. Although the nozzle tip 22 is merely pressed against the seat 20, and although the molten plastic foam leaves the injection passageway 30 under very high pressure, the connection between the nozzle tip 22 and seat 20 is leakproof. Such leakproof engagement between the nozzle tip 22 and seat 20 is achieved in part because the ball and socket joint 27 permits the nozzle tip to have a small but universal movement to adapt to changing conditions. The nozzle tip 22 and seat 20 desirably each have spherical surfaces, the nozzle tip desirably being more abrasion resistant than the seat 20, which can be replaced if deformed.

The globular clamp 28 is made from a plurality of parts which can be assembled to surround the spherical-type bearing 29 on the nozzle 21. Each nozzle 21 is supported by a ball and socket joint 27, thereby overcoming the difficulties attributable to the rigidly mounted nozzles of previous injection molding apparatus.

The invention claimed is:

1. In a molding apparatus for use in a method in which members of a split mold are periodically opened and closed, said opening and closing of the molding apparatus being actuated by the movement of a reciprocating part of the molding apparatus, one part of the split mold being secured to said reciprocating part of the molding apparatus, and another portion of the mold being secured to a fixed part of the molding apparatus, and in which method plastic foam is injected into the closed mold, material is cooled in the mold, and the thus molded foam plastic article removed from the opened mold prior to a repetition of the molding cycle, the molding apparatus having a plurality of nozzles, each nozzle having a tip engageable with a seat of a filling orifice in the mold, and each nozzle having an injection passageway for the flow of plastic foam, and wherein difficulties exist in maintaining leakproof engagement between the tips of the nozzle and the seats of the filling orifices, the improvement which consists of:

a heated delivery line in the molding apparatus through which the plastic foam flows toward each of the nozzles;

a plurality of support means, one for each nozzle, said support means comprising a ball and socket joint, there being passageways permitting the plastitc foam to flow from the delivery line into the injection passageway of each of the nozzles, each ball socket joint being adapted to permit the tip of the nozzle to be swung into any position about 3 mm. from a central position and to any position within the solid angle defined by such 3 mm. departure from such central position;

a purging pin mounted for reciprocation in the injection passageway of each nozzle;

a hydraulic cylinder mounted at the end of each nozzle opposite the tip and swingable about its ball and socket joint simultaneously with the tip, each hydraulic cylinder providing independent actuating means for its purging pin, said actuating means advancing its purging pin to terminate the flow of plastic foam into the injection passageway and to clean the injection passageway at the end of each mold filling step, and said actuating means shifting the purging pin to a regulated retracted position at the beginning of the next mold filling operation.

2. Molding apparatus of claim 1 in which each nozzle has an abrasion resilient spherical tip, in which each orifice seat has a spherical surface, said seat being softer than the nozzle tip, the combination of the tip and seat providing leakproof connection throughout the swinging of the nozzle as much as 3 mm. from central alignment.

3. Molding apparatus of claim 2 in which the radius of the spherical surfaces of the seat and nozzle tip are about equal and a small fraction of the radius from the ball and socket joint to the tip.

References Cited

UNITED STATES PATENTS 2,456,349 12/1948 Ward _____ 18—30
2,533,468 12/1950 Jurgeleit _____ 18—30

FOREIGN PATENTS 448,442 5/1948 Canada.
1,217,597 5/1966 Germany.

WILBUR L. McBAY, Primary Examiner